(12) United States Patent
Voss et al.

(10) Patent No.: US 10,941,979 B2
(45) Date of Patent: Mar. 9, 2021

(54) APPARATUS AND METHOD FOR COOLING PRODUCTS

(71) Applicant: L'Air Liquide, Societe Anonyme pour l'Etude et l'Exploitation des Procedes Georges Claude, Paris (FR)

(72) Inventors: Robert Voss, Krefeld (DE); Alexander Angenheister de Freitas, Neuss (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 68 days.

(21) Appl. No.: 16/225,603

(22) Filed: Dec. 19, 2018

(65) Prior Publication Data
US 2019/0186815 A1    Jun. 20, 2019

(30) Foreign Application Priority Data
Dec. 19, 2017 (EP) .................................. 17208689

(51) Int. Cl.
| F25D 25/04 | (2006.01) |
| B65G 69/20 | (2006.01) |
| F25D 13/06 | (2006.01) |
| F25D 3/11  | (2006.01) |

(52) U.S. Cl.
CPC ............. *F25D 25/04* (2013.01); *B65G 69/20* (2013.01); *F25D 13/067* (2013.01); *B65G 2201/0202* (2013.01); *F25D 3/11* (2013.01)

(58) Field of Classification Search
CPC .......... F25D 25/04; F25D 13/067; F25D 3/11; B65G 69/20; B65G 2201/0202
See application file for complete search history.

(56) References Cited

U.S. PATENT DOCUMENTS 4,077,226 A * 3/1978 Strong ..................... F25D 3/11
                                                   62/374

FOREIGN PATENT DOCUMENTS

| EP | 1 621 830 | 2/2006 |
| JP | H11 63777 | 3/1999 |
| WO | WO 2006/126870 | 11/2006 |

OTHER PUBLICATIONS

EP Search Report for EP 17208689.4, dated Jun. 21, 2018.

* cited by examiner

*Primary Examiner* — Ana M Vazquez
(74) *Attorney, Agent, or Firm* — Christopher J. Cronin

(57) ABSTRACT

Apparatus for cooling products includes a cooling chamber with a conveyor for conveying the products through the chamber, at least one circulator for circulating a cooling gas within at least a part of the chamber, a first guiding element for guiding the cooling gas on a first conveyor side, and a second guiding element for guiding the cooling gas on a second conveyor side, wherein the first and second guiding elements are arranged within the chamber such that the cooling gas can impinge the first side, and the first and second guiding elements are oriented obliquely compared to the conveyor.

7 Claims, 1 Drawing Sheet

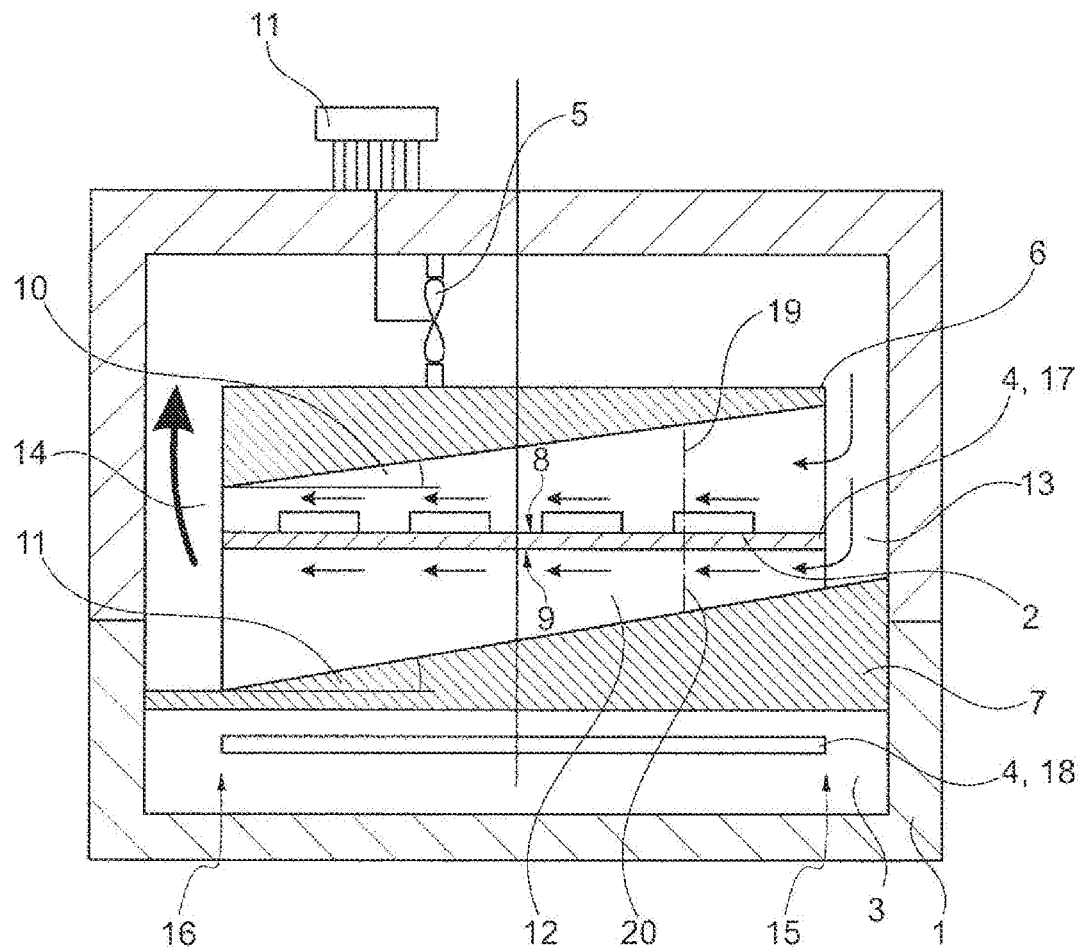

APPARATUS AND METHOD FOR COOLING PRODUCTS

CROSS-REFERENCE TO RELATED APPLICATIONS

This application claims the benefit of priority under 35 U.S.C. § 119 (a) and (b) to EP patent application No. EP 17208689.4, filed Dec. 19, 2017, the entire contents of which are incorporated herein by reference.

BACKGROUND

Field of the Invention

The present invention is directed to an apparatus and a method for cooling products, in particular food products.

Related Art

Cooling apparatuses and cooling methods are known for various goods, in particular for food products. Thereby, the goods are usually treated by a cooling gas such as nitrogen. The temperature of the goods can be reduced due to the low temperature the cooling gas usually has. This way, in particular perishable food products can be frozen for storage and/or delivery to final customers.

The energy efficiency and cooling rates that can be achieved with known apparatuses and methods for cooling products are insufficiently low for some applications.

SUMMARY OF THE INVENTION

It is, therefore, an object of the present invention to overcome at least in part the disadvantages known from prior art and in particular to provide an apparatus and a method for cooling products in a particularly energy efficient and fast way.

These objects are solved by the features of the independent claims. Dependent claims are directed to preferred embodiments of the present invention.

According to the present invention an apparatus for cooling products is provided that comprises at least:
- a cooling chamber with a conveyor for conveying the products through the cooling chamber,
- at least one circulator for circulating a cooling gas within at least a part of the cooling chamber,
- a first guiding element for guiding the cooling gas on a first side of the conveyor,
- a second guiding element for guiding the cooling gas on a second side of the conveyor, wherein the first guiding element and the second guiding element are arranged within the cooling chamber such that the cooling gas can impinge the first side of the conveyor, and wherein the first guiding element and the second guiding element are oriented obliquely compared to the conveyor.

The first side of the conveyor is opposite the second side of the conveyor. The conveyor and the whole apparatus are preferably designed to convey the products to be cooled through the cooling chamber on the first side of the conveyor. The described apparatus is preferably designed to cool food products such as meat patties or hot breaded food products like Schnitzel. In particular, the products can be frozen by the described cooling apparatus. Thereby, food products can be prepared for storage and/or delivery to final customers. However, not only food products but also any other goods can be cooled with the described apparatus.

The products can be cooled within the cooling chamber. The cooling chamber is preferably a space that is thermally isolated form the environment. The cooling chamber is preferably confined by respective boundaries such as housing walls and preferably doors, locks and/or barriers through which the conveyor enters and leaves the cooling chamber.

The products can be conveyed through the cooling chamber by the conveyor. The conveyor comprises preferably a conveyor belt, onto which the products can be placed. The conveyor belt can be held and moved by two or more rolls. That is, the conveyor can have a first run and a second run, which can be moved concurrently. Thereby, the products can be placed in particular on the first run. The products can be placed onto the conveyor outside or inside the cooling chamber. Also, the products can be taken from the conveyor outside or inside the cooling chamber. Air locks can be provided, via which the products can be moved into and out of the cooling chamber with a reduced loss of cool atmosphere from inside the cooling chamber to the surroundings. The cooling chamber is preferably designed as a tunnel through which the conveyor can convey the products. The apparatus hence can also be referred to as a cooling tunnel.

Inside the cooling chamber the products can be cooled. Therefore, the cooling gas is preferably introduced into the cooling chamber. The cooling gas is preferably a gas such as nitrogen or carbon dioxide. The cooling chamber comprises preferably at least one cooling gas inlet, through which the cooling gas or at least a gas such as nitrogen or carbon dioxide can be introduced into the cooling chamber. Nitrogen or carbon dioxide can be provided to the cooling gas inlet, for example, from a storage tank and/or from a network for supplying the cooling gas. Nitrogen or carbon dioxide thereby can be provided in the gaseous and/or in the liquid state. If the gas is provided at least in part in its liquid state, the gas can evaporate within the cooling chamber. The cooling gas is preferably provided at a low temperature such as $-150°$ C. to $-40°$ C. such that the products can be cooled by the cooling gas.

Preferably the cooling gas is introduced into the cooling chamber in such a way that the cooling gas impinges the products. This can be achieved in particular by a respective design and arrangement of the cooling gas inlet. Further, the cooling gas that is already within the cooling chamber is preferably circulated through the cooling chamber. Thereby, the cooling gas can impinge products more than once. This can increase energy efficiency. The cooling gas can be circulated by the at least one circulator. The at least one circulator preferably comprises a fan. With the at least one circulator a flow of the cooling gas can be generated within the cooling chamber. With the at least one circulator the cooling gas can be preferably circulated at least within that part of the cooling chamber in which the conveyor is located.

The apparatus according to the present invention allows to cool products highly energy efficiently, in particular due to the first and second guiding elements.

The first and second guiding elements are arranged such that the cooling gas is guided onto the first side of the conveyor in a particularly uniform way. This means in particular that the pressure and/or the flow rate at which the cooling gas impinges the first side of the conveyor vary preferably by less than 20%, in particular by less than 10% between any two points on the conveyor surface. That means that for the pressure and/or for the flow rate values measured at any two points on the surface of the conveyor do not vary by more than 20%, in particular 10%. Preferably, the pressure and flow rate vary by less than 20%, in particular less than 10%, between any two points of the surface of the conveyor on a line perpendicular to the conveying direction. The pressure and/or the flow rate can be measured with standard gauges such as a differential pressure sensor or a capacitive flow sensor, respectively.

Thus, all products on the conveyor are equally impinged by the cooling gas so that all products are cooled equally. If a certain amount of cooling is required, e. g. to cool all products a specific temperature, such a uniform cooling of all products can be particularly energy efficient as none of the products has to be cooled more than necessary. With a non-uniform cooling, some of the products have to be cooled more than necessary if all products are supposed to be cooled below a predetermined minimum temperature.

The uniform cooling can be achieved with the first and second guiding elements in particular if the cooling gas can flow through a first flow height adjacent to the first side of the conveyor and through a second flow height adjacent to the second side of the conveyor. Preferably, the first flow height decreases from a first lateral side of the conveyor to a second lateral side of the conveyor, whereby the sum of the first flow height and the second flow height is constant. The flow height is the distance between the conveyor and the respective guiding element as measured perpendicular to the conveyor surface. The term height thereby refers in particular to a case where the conveyor is oriented horizontally so that the flow height is measured upwards or downwards with respect to gravity. However, the conveyor may also be oriented in any other orientation. Thereby, the flow height is still defined as the distance between the conveyor and the respective guiding element as measured perpendicular to the conveyor surface, even if this distance may not be a height in the sense that it is measured upwards or downwards from the conveyor.

Alternatively, it is preferred that the first flow height decreases along the conveying direction, that is either in the conveying direction or contrary to the conveying direction. Also in this alternative, the sum of the first flow height and the second flow height is preferably constant. When being conveyed by the conveyor, a particular product is thus subject to varying first and second flow heights.

Perpendicular to the conveying direction the conveyor preferably extends between the first and second lateral sides. The conveying direction is the direction into which the products can be conveyed by the conveyor. The cooling gas can flow form the first lateral side to the second lateral side of the conveyor, whereby the reduction of the first flow height causes the cooling gas to penetrate through the conveyor. Preferably, the first flow height is reduced constantly and/or steadily from the first lateral side to the second lateral side of the conveyor. In that case the cooling gas can penetrate through the conveyor particularly uniformly. Therein, constantly means that the first flow height is varied in a linear way. Steadily means that the first flow height is varied without any steps. However, this does not mean that the first flow height may not have smaller steps that do not affect the flow of the cooling gas significantly. In particular, steps of less than 5% of the sum of the first and second flow heights shall not be considered as steps here.

The variation in the flow heights can be achieved as the first and second guiding elements are oriented obliquely to the conveyor.

In a preferred embodiment of the apparatus the conveyor comprises a plurality of perforation openings.

The perforation openings are preferably openings within the conveyor (belt) extending through the conveyor (belt). Through the perforation openings the cooling gas can penetrate through the conveyor from the first side of the conveyor to the second side of the conveyor. The smaller the density of the perforation openings is (that is the fewer perforation openings are provided and/or the smaller the perforation openings are per area of the conveyor), the smaller is a second pressure on the second side of the conveyor compared to a first pressure on the first side of the conveyor.

In a further preferred embodiment of the apparatus the conveyor is designed such that a pressure gradient between the first side of the conveyor and the second side of the conveyor is generated when the first side of the conveyor is impinged with the cooling gas.

If the cooling gas impinges the first side of the conveyor the flow of the cooling gas is slowed down by the conveyor. Thus, the pressure of the cooling gas at the second side of the conveyor is lower than on the first side of the conveyor. Between the first side of the conveyor and the second side of the conveyor a pressure gradient is generated.

In a further preferred embodiment of the apparatus the first pressure is between 10 Pa and 300 Pa larger than the second pressure.

In a further preferred embodiment the apparatus is designed such that the products can be received at the first side of the conveyor.

This means that preferably the products are in use conveyed on the first side of the conveyor. If the products are placed onto the first side of the conveyor, the products can be impinged by the cooling gas as the first side of the conveyor is impinged with the cooling gas. Preferably, the conveyor is oriented in such a way that the first side is an upper side. The cooling gas then can impinge the first side of the conveyor from a top of the cooling chamber (from above), thereby pressing the products down onto the conveyor. In this case the first aperture element is preferably arranged above the first side of the conveyor and the second aperture element is preferably arranged below the second side of the conveyor.

In a further preferred embodiment of the apparatus the first guiding element and the second guiding element are oriented obliquely compared to the conveyor in a direction perpendicular to a conveying direction of the conveyor.

This means that in a cross sectional view showing a plane perpendicular to the conveying direction the first and second guiding elements are oriented obliquely to the conveyor. With this orientation of the first and second guiding elements the cooling gas can impinge the conveyor particularly uniformly along the whole conveyor in the conveying direction.

In a further preferred embodiment of the apparatus the first guiding element and the second guiding element are oriented parallel to each other.

In this embodiment the first and second guiding elements have the same shape. The first and second guiding element are spaced apart and arranged parallel to each other. Thereby, the sum of the first and second flow heights for the cooling gas when flowing from the first lateral side to the second lateral side of the conveyor is constant.

In a further preferred embodiment of the apparatus the first guiding element and the second guiding element each have a planar shape.

With planar guiding elements the first flow height can be reduced constantly and/or steadily from the first lateral side to the second lateral side of the conveyor.

In a further preferred embodiment of the apparatus the first guiding element and the conveyor enclose a first angle in the range of 10° to 60° [degrees]. In a further preferred embodiment of the apparatus the second guiding element and the conveyor enclose a second angle in the range of 10° to 60° [degrees]. The first and second angels are defined in a plane perpendicular to the conveying direction. Preferably, the first and second angles are the same at all positions of the first and second guiding elements. That is particularly the case if the conveyor and the first and second guiding elements are planar. Alternatively, it is preferred that the first and second angles vary but are within the described range at all positions of the first and second guiding elements.

In a further preferred embodiment of the apparatus the cooling gas is guidable into a cooling space between the first guiding element and the second guiding element via an inlet path at a first lateral side of the conveyor.

In a further preferred embodiment of the apparatus the cooling gas is guidable out of a cooling space between the first guiding element and the second guiding element via an outlet path at a second lateral side of the conveyor.

The cooling space is confined at least by the first and second guiding elements. The cooling space does not have to be confined to all sides. The products preferably can be conveyed by the conveyor through the cooling space. Within the cooling space the cooling gas can penetrate through the conveyor. If the cooling gas is introduced into the cooling space at the first lateral side of the conveyor, the cooling gas can flow through the cooling space and to the second lateral side of the conveyor. At the second lateral side the cooling gas can be guided out of the cooling space. Outside the cooling space the cooling gas can be guided back to the first lateral side of the conveyor. Thereby, the cooling gas can be circulated by the at least one circulator, which is preferably arranged outside the cooling space.

According to a further aspect of the invention a method for cooling products is provided that comprises at least the following steps:
 a) conveying the products through a cooling chamber with a conveyor,
 b) generating a flow of a cooling gas within the cooling chamber, wherein the flow is generated in such a way that the cooling gas impinges a first side of the conveyor, wherein the cooling gas can flow through a first flow height adjacent to the first side of the conveyor and through a second flow height adjacent to the second side of the conveyor, wherein the first flow height decreases from a first lateral side of the conveyor to a second lateral side of the conveyor, whereby the sum of the first height section and the second flow height is constant.

The details and advantages disclosed for the apparatus according to the present invention can be applied to the method of the invention, and vice versa. In particular it is preferred that the described method is performed using the described apparatus.

In a preferred embodiment of the method the flow of the cooling gas is directed by a first guiding element and a second guiding element.

In a further preferred embodiment of the method at least between the first guiding element and the second guiding element the flow of the cooling gas is oriented from a first lateral side of the conveyor to a second lateral side of the conveyor.

In a further preferred embodiment of the method the cooling gas is guided into a cooling space between the first guiding element and the second guiding element at a first lateral side of the conveyor.

In a further preferred embodiment of the method the cooling gas is guided out of a cooling space between the first guiding element and the second guiding element at a second lateral side of the conveyor.

It should be noted that the individual features specified in the claims may be combined with one another in any desired technological reasonable manner and form further embodiments of the invention. The specification, in particular in connection with the FIGURE, explains the invention further and specifies particularly preferred embodiments of the invention. Particularly preferred variants of the invention and also the technical field will now be explained in more detail on the basis of the enclosed FIGURE. It should be noted that the exemplary embodiment shown in the FIGURE is not intended to restrict the invention. The FIGURE is schematic and may not be to scale. The FIGURE displays:

BRIEF DESCRIPTION OF THE FIGURES

FIG. 1 is a cross-sectional view of an apparatus for cooling products.

DETAILED DESCRIPTION OF THE INVENTION

FIG. 1 shows an apparatus 1 for cooling products 2. The apparatus 1 comprises a cooling chamber 3 with a conveyor 4 for conveying the products 2 through the cooling chamber 3. The conveyor has a first run 17 and a second run 18. The products 2 can be received at a first side 8 of the conveyor. The conveyor 4 comprises a plurality of perforation openings and is designed such that a pressure gradient between the first side 8 of the conveyor 4 and a second side 9 of the conveyor 4 is generated when the first side 8 of the conveyor 4 is impinged with a cooling gas. The conveyor 4 is designed such that the cooling gas can penetrate through the conveyor 4 so as to have a second pressure at the second side 9 of the conveyor 4. The second pressure is lower than the first pressure. In this example, the first side 8 of the conveyor 4 is an upper side and the second side 9 of the conveyor 4 is a lower side with respect to gravity. Also, the apparatus 1 comprises a circulator 5 for circulating the cooling gas within the cooling chamber 3. The circulator 5 has a motor 11. Further, the apparatus comprises a first guiding element 6 for guiding the cooling gas on the first side 8 of the conveyor 4 and a second guiding element 7 for guiding the cooling gas on the second side 9 of the conveyor 4.

The first guiding element 6 and the second guiding element 7 are arranged within the cooling chamber 3 such that the cooling gas can impinge the first side 8 of the conveyor 4. Between the conveyor 4 and the first guiding element 6 a first flow height 19 is defined. Between the conveyor 4 and the second guiding element 7 a second flow height 20 is defined. The first flow height 19 is reduced form a first lateral side 15 to a second lateral side 16, whereby the sum of the first flow height 19 and the second flow height 20 is constant. In this exemplary embodiment the conveyor 4 is configured such that the flow heights 19, 20 vary perpendicular to a conveying direction. The conveying direction in FIG. 1 is oriented perpendicular to the drawing plane. In a different embodiment that is not depicted in the drawings it is preferred that the conveyor 4 is configured such that the flow heights 19, 20 vary along the conveying direction.

The first guiding element 6 and the second guiding element 7 each have a planar shape and are oriented parallel to each other and obliquely compared to the conveyor 4 in a direction perpendicular to a conveying direction of the conveyor 4. The conveying direction of the conveyor 4 is perpendicular to the drawing plane in FIG. 1. The first guiding element 6 and the conveyor 4 enclose a first angle 10. The second guiding element 7 and the conveyor 4 enclose a second angle 11. The cooling gas is guidable into a cooling space 12 between the first guiding element 6 and the second guiding element 7 via an inlet path 13 at a first lateral side 15 of the conveyor 4 and out of the cooling space 12 via an outlet path 14 at a second lateral side 16 of the conveyor 4.

In the cross-section view of FIG. 1 one circulator 5 can be seen. Further circulators 5 can be provided at other positions in the conveying direction.

With the apparatus 1 products 2 such as food products can be cooled using a cooling gas such a gas comprising nitrogen. With guiding elements 6, 7 a particularly uniform flow of the cooling gas can be generated. Thereby, the products 2 can be cooled particularly energy efficiently and at a particularly high cooling rate.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 apparatus
2 product
3 cooling chamber
4 conveyor
5 circulator
6 first guiding element
7 second guiding element
8 first side
9 second side
10 first angle
11 second angle
12 cooling space
13 inlet path
14 outlet path
15 first lateral side
16 second lateral side
17 first run
18 second run
19 first flow height
20 second flow height

What is claimed is:

1. An apparatus for cooling products comprising:
a cooling chamber with a conveyor for conveying the products through the cooling chamber, the conveyor having first and second sides and a travel direction from an upstream end of the cooling chamber to a downstream end of the cooling chamber;
at least one circulator for circulating a cooling gas within at least a part of the cooling chamber;
a first planar guiding element having a first end adjacent the upstream end and a second end adjacent the downstream end, the first planar guiding element being disposed below the at least one circulator; and
a second planar guiding element having a first end adjacent the upstream end and a second end adjacent the downstream end, the second planar guiding element extending below and parallel to the first planar guiding element, wherein:
the at least one circulator is oriented to direct the cooling gas through an upper gap in between a top of the cooling chamber and a top of the first planar guiding element in a direction opposite that of the travel direction of the conveyor;
the first planar guiding element and the second planar guiding element are arranged within the cooling chamber such that the cooling gas that is directed by the circulator along the upper gap is first directed downwardly into an upstream gap between the upstream end and the first sides of the first and second planar guiding elements and is next directed upwardly into a downstream gap between the downstream end and the second sides of the first and second planar guiding elements, and then back into the upper gap towards the at least one circulator, the cooling gas flowing in between the first and second planar guiding elements along a cooling gas flow path that is constrained by the first and second planar guiding elements and which impinges the first side of the conveyor and extends through the conveyor to the second side of the conveyor, the cooling gas flow path forming an angle with the conveyor in a range of 5° to 60°.

2. The apparatus of claim 1, wherein the conveyor comprises a plurality of perforation openings.

3. The apparatus of claim 1, wherein the apparatus is designed such that the conveyor receives products at the first side of the conveyor.

4. The apparatus of claim 1, wherein the first planar guiding element and the second planar guiding element are oriented obliquely compared to the conveyor in a direction perpendicular to a conveying direction of the conveyor.

5. The apparatus of claim 1, wherein the cooling gas is guidable into a cooling space between the first planar guiding element and the second planar guiding element via an inlet path at a first lateral side of the conveyor.

6. The apparatus of claim 1, wherein the cooling gas is guidable out of a cooling space between the first planar guiding element and the second planar guiding element via an outlet path at a second lateral side of the conveyor.

7. A method for cooling products, comprising the steps of:
providing the apparatus of claim 1;
conveying the products through the cooling chamber with the conveyor; and
generating a flow of a cooling gas within the cooling chamber with the at least one circulator through the upper gas in the direction opposite that of the travel direction of the conveyor, downwardly into the upstream gap, through the cooling gas flow path across the conveyor, upwardly into the downstream gap, and back into the upper gap towards the at least one circulator.

\* \* \* \* \*